A. H. WILLITS.
PLOW.
APPLICATION FILED JAN. 2, 1912.
1,052,544.
Patented Feb. 11, 1913.
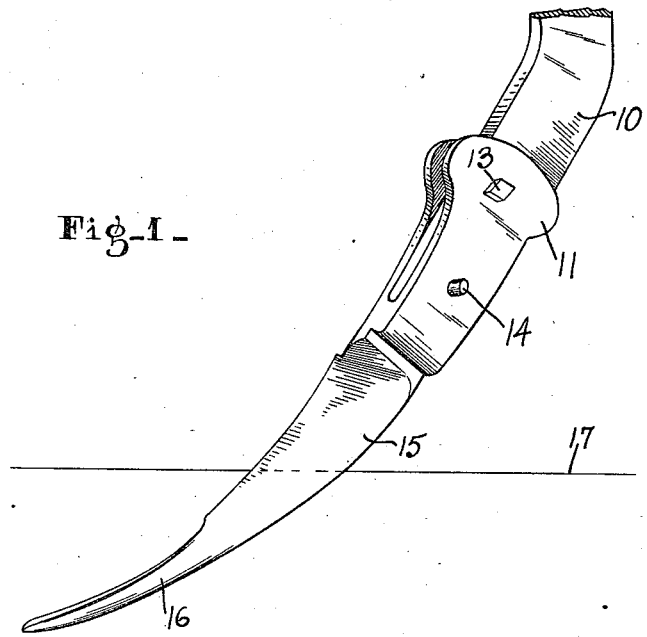
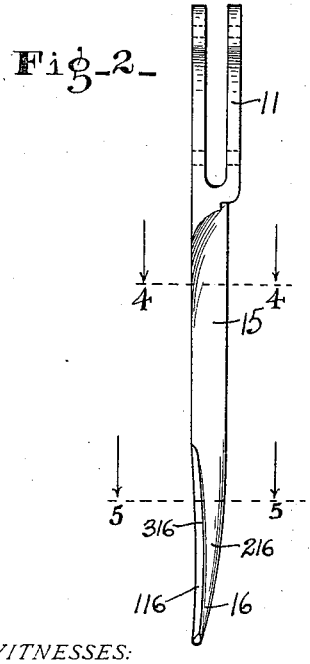
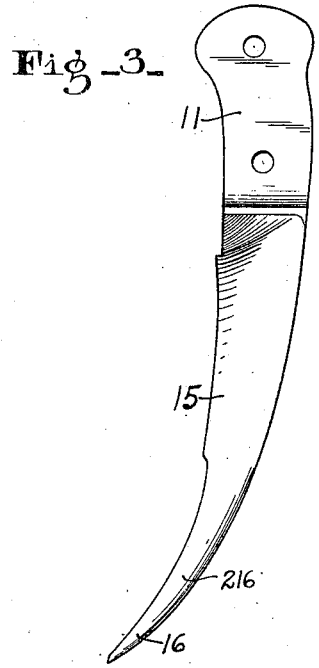
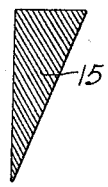
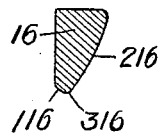
WITNESSES:
A. H. Edgerton.
O. M. McLaughlin
INVENTOR.
Albert H. Willits.
BY
V. H. Lockwood,
ATTORNEY.

UNITED STATES PATENT OFFICE.

ALBERT H. WILLITS, OF INDIANAPOLIS, INDIANA.

PLOW.

1,052,544.     Specification of Letters Patent.     Patented Feb. 11, 1913.

Application filed January 2, 1912. Serial No. 669,018.

*To all whom it may concern:*

Be it known that I, ALBERT H. WILLITS, of Indianapolis, county of Marion, and State of Indiana, have invented a certain useful Plow; and I do hereby declare that the following is a full, clear, and exact description thereof, reference being had to the accompanying drawings.

The object of this invention is to provide an improved plow for cultivators for young corn and other small plants. It has an upper shank portion, and intermediate and lower portions differing from each other. The lower portion is doubly beveled so as to crowd up the dirt and loosen it for the admission of air into the dirt and yet without disturbing the surface materially. For young corn and like plants this is all of the soil treatment desired. For that reason the doubly beveled end of the plow is very narrow in comparison with the ordinary shovel plow, and it has other peculiarities of conformation adapted to cause it to run true. The upper portion is beveled in but one direction for the purpose of preventing the corn or other small plants from being mashed or covered with clods moved by the plow as it goes along. It is relatively narrow as compared with many plows, but tends to crowd the surface and clods somewhat away from the plants, and also tends to cut or divide the surface or crust, if there be any crust, so that the portion of the crust or surface next to the corn will not be materially disturbed. Another advantage of the plow is that it is very light and simple in construction and yet capable of giving the young corn or other small plants superior soil treatment, and it dispenses with the use of dirt fenders and the like.

The nature of the invention will be understood from the accompanying drawings and the following description and claims.

In the drawings, Figure 1 is a perspective view of the new plow and a part of the shank to which it is attached. Fig. 2 is a front elevation of the same. Fig. 3 is a side elevation of Fig. 2. Figs. 4 and 5 are cross sections on the lines 4—4 and 5—5 of Fig. 2.

This plow can be used in connection with any sort of cultivator frame and has been used heretofore in connection with the ordinary corn cultivator having a plurality of blades. The frame of the cultivator, however, is not shown, but there is shown a standard 10 to which the double plates of the plow shank 11 are secured by a metal bolt 13 and a wooden pin 14, the latter being adapted to break upon excessive strain. The shank of the plow is divided into two parallel plates spaced apart, and they envelop the lower part of the bar 10.

The plow may be said to consist of the shank 11, an intermediate portion 15, and a lower blade portion 16. The blade portion is intended always to operate under the surface of the ground, the surface of the soil being indicated by the line 17. The intermediate portion 15 is intended to cut or travel through the surface of the soil. The plow shown is the left-hand plow, but the right-hand plow is identical excepting it throws the dirt to the right and both are used on the same cultivator, one plow running on one side of the row of corn, and the other plow running on the other side of the row of corn. The peculiarity of the intermediate portion 15 is that it is very narrow as compared with the ordinary single throw plow and is not formed so as to turn over the dirt but merely to crowd the dirt slightly to one side, and tend to keep from crowding it in the other direction or from the plant. In the full-sized plow the thickness of the intermediate portion of its widest point, that is, at the rear, is less than an inch, so that the angle between the bevel and the straight sides is quite acute, and it amounts merely to a half-wedge, straight on one side and beveled on the other side and sufficient to crowd the dirt slightly away from the row of corn. The forward edge of this intermediate portion is preferably sharp so as to cut the surface of the crust of the soil comparatively smoothly and tend to prevent it from breaking up into lumps or cakes which might fall over and mash or cover the young plants.

The blade or lower portion of the plow is a continuation of the intermediate portion, the forward and rear surfaces being curved with substantial regularity but coming to a point at the lower end. The side surface of both portions is perfectly straight and in true alinement, but the outside surface of the lower or blade portion curves inwardly gradually to the point and toward and almost to the straight side. This last bevel or inclination is to cause the plow to run true and not tend unnaturally to run away from the row of corn. The thickness of the blade portion is at a juncture with the intermediate portion, about the same as the thickness of the latter, and it gradually diminishes until the point is reached, which is about one-fourth of an inch wide. Hence, the blade portion is very narrow and the bevel sides thereof are correspondingly narrow. The inner beveled surface 116 is at its upper end narrower than the outer beveled surface 216, but since the outer beveled surface gradually grows narrower toward the point, the inner beveled surface is slightly wider than the outer beveled surface at the point. In other words, the dividing line 316, which separates the two beveled surfaces 116 and 216, is substantially parallel throughout its length with the flat side of the plow. The lengths of the blade and intermediate portions are preferably about the same, although the invention is not limited to the relative dimensions of those parts.

This sort of plow has been used by me on cultivators with success in the first two plowings of young corn. It avoids the use of dirt fenders entirely, and since the plows are much narrower and lighter than the shovels ordinarily used, it renders the operation of the cultivator while treating young corn, very easy and simple, giving the operator easy and ready control of the movement of the plow points.

While the shank portion is shown integral with the intermediate portion of the plow, still the invention is not necessarily limited to such an arrangement.

I claim as my invention:

1. A plow consisting of an upper shank portion, an intermediate singly beveled portion, and a lower doubly beveled portion.

2. A plow consisting of an upper shank portion, an intermediate singly beveled portion, and a lower doubly beveled portion, the lengths of the intermediate and lower portions being substantially the same.

3. A plow comprising an upper shank portion, an intermediate portion with one side flat and the other side inclined at an acute angle from the flat side, and a lower portion with both sides thereof oppositely inclined and longitudinally beveled on the side corresponding with the inclined side of the intermediate portion so that the width of said lower portion is gradually reduced as it approaches the point.

4. A plow comprising an upper shank portion, an intermediate portion with one side flat and the other side inclined at an acute angle from the flat side, and a lower portion in continuation of the intermediate portion with a portion of one side flat and in alinement with the flat side of the intermediate portion and with the upper portion of the same side inclined, and the other side of the lower portion oppositely inclined and in substantial alinement with the inclined side of the intermediate portion, so that the ridge between the inclined surfaces of the lower portion will be substantially parallel with the flat side of the plow and the side of the lower portion corresponding with the inclined side of the intermediate portion being longitudinally beveled so as to reduce the width of the lower portion gradually as it reaches the point of the plow, the forward edge of the intermediate and lower portions of the plow being concave and the rear surface thereof being convex, substantially as shown and described.

In witness whereof, I have hereunto affixed my signature in the presence of the witnesses herein named.

ALBERT H. WILLITS.

Witnesses:
GERTRUDE H. BOINK,
E. H. MAYO.